(12) United States Patent
Dugo (10) Patent No.: US 11,566,863 B2
(45) Date of Patent: Jan. 31, 2023

(54) WEARABLE SELF DEFENSE APPARATUS AND METHOD OF SELF DEFENSE

(71) Applicant: Troy Francis Dugo, Charlotte, NC (US)

(72) Inventor: Troy Francis Dugo, Charlotte, NC (US)

(*) Notice: Subject to any disclaimer, the term of this patent is extended or adjusted under 35 U.S.C. 154(b) by 2 days.

(21) Appl. No.: 17/322,223

(22) Filed: May 17, 2021

(65) Prior Publication Data

US 2022/0252368 A1 Aug. 11, 2022

Related U.S. Application Data

(63) Continuation-in-part of application No. 16/444,051, filed on Jun. 18, 2019, now Pat. No. 11,009,965.

(51) Int. Cl.
*F41A 19/64* (2006.01)
*F41H 13/00* (2006.01)
*F41H 9/10* (2006.01)

(52) U.S. Cl.
CPC .......... *F41A 19/64* (2013.01); *F41H 13/0025* (2013.01); *F41H 9/10* (2013.01); *F41H 13/0018* (2013.01)

(58) Field of Classification Search
CPC .............................. F41A 19/64; F41H 13/0025
See application file for complete search history.

(56) References Cited

U.S. PATENT DOCUMENTS

| | | | |
|---|---|---|---|
| 4,337,496 A | 6/1982 | Laird | |
| 5,282,481 A | 2/1994 | Ziemer | |
| 6,961,227 B1 | 11/2005 | Whiton et al. | |
| 8,154,844 B2 | 4/2012 | Brown | |
| 9,008,973 B2 | 4/2015 | French | |
| 9,922,537 B2* | 3/2018 | Shah | F41H 9/10 |
| 10,372,223 B2 | 8/2019 | DeMichele | |
| 11,388,516 B2* | 7/2022 | Stachura | G10L 25/51 |

(Continued)

FOREIGN PATENT DOCUMENTS

CN 204351219 U 5/2015

OTHER PUBLICATIONS

International Search Report and Written Opinion for PCT/US22/27329, USPTO Examination Authority, dated Aug. 15, 2022.

*Primary Examiner* — Michael C Zarroli
(74) *Attorney, Agent, or Firm* — Invention To Patent Services; Alex Hobson (57) ABSTRACT

A wearable self-defense apparatus has a body portion configured to be worn on or around a body part and includes a one or more deterrent devices such as an audible deterrent, a light deterrent or a high voltage transmitter deterrent for deterring an attacker. A controller is configured to control one or more operations of the apparatus to allow activation of the one or more deterrents upon detection of an activation motion by a gesture detector. An alert message may be sent to one or more alert contacts via a wireless transmitter directly or through a wireless connection with a mobile device. A global positioning system may provide a location of the apparatus to an alert contact upon activation, and a call center may call the wearer of the apparatus to confirm their safety. The high voltage transmitter is configured to charge conductors to transmit high voltage to an attacker.

19 Claims, 6 Drawing Sheets

(56) References Cited

U.S. PATENT DOCUMENTS

| | | | |
|---|---|---|---|
| 2004/0154071 A1* | 8/2004 | Frahm | A41D 19/0024 |
| | | | 2/160 |
| 2006/0026884 A1 | 2/2006 | Cerovic et al. | |
| 2009/0158921 A1 | 6/2009 | Norman | |
| 2011/0013337 A1 | 1/2011 | Brown | |
| 2011/0046920 A1 | 2/2011 | Amis | |
| 2013/0294005 A1 | 11/2013 | Garaycochea | |
| 2016/0328023 A1 | 11/2016 | Douglas et al. | |
| 2019/0018506 A1 | 1/2019 | Missig | |
| 2019/0282106 A1* | 9/2019 | Shay | A61B 5/681 |

* cited by examiner

WEARABLE SELF DEFENSE APPARATUS AND METHOD OF SELF DEFENSE

CROSS REFERENCE TO RELATED APPLICATIONS

This application is a continuation in part of U.S. patent application Ser. No. 16/444,051, filed on Jun. 18, 2019 and currently pending; the entirety of which is hereby incorporated by reference herein.

BACKGROUND OF THE INVENTION

Field of the Invention

The present invention relates to the field of self-defense apparatuses. More particularly, the present invention relates to a wearable self-defense apparatus and a method of utilizing the apparatus for self-defense

Background

Various non-lethal self-defense devices exist in the prior art. Most of the existing self-defense devices make use of electricity to temporarily disable an assailant. One such example of such self-defense device is a stun gun, which when activated, transmits high voltage electricity to the body of the target through a set of electrodes connected to the stun gun. Some other self-defense devices available in the market are in form of a flashlight, which is capable of generating and transferring the high voltage electricity to the target upon activated by the user. However, all such self-defense devices are to be carried by the user in their carry bags or to be attached to a wearable holder. When needed, the user must reach for the self-defense device from the stored place and activate the device pointing the target. Sometimes, when a user carrying a self-defense device faces an assailant there might not be enough time left for the user to reach for the self-defense device and point towards the assailant to disable using high voltage electricity generated by the device. This leaves the user, especially women, vulnerable to such attacks even though they carry such self-defense devices.

The above said drawbacks associated with the use of existing self-defense devices are somewhat solved by the development of wearable self-defense devices. Such wearable self-defense devices are available in various shapes and designs and the user needs to wear the device all the time to protect themselves from getting attacked. Most of the existing wearable self-defense devices are difficult to be worn by the user for long periods and are not aesthetically pleasing. Further, these wearable self-defense devices require the users to activate the device, when in need, by pressing an actuator or a button on the device using a hand of the user. However, such as actuation method sometimes would not work if the attacker already sees the movement by the user to activate the self-defense device.

Hence, there is a need for a wearable self-defense device that would solve the problems and drawbacks associated with the existing self-defense devices as discussed above. The needed wearable self-defense device would also be comfortable for the wearer and aesthetically pleasing. Further, the needed wearable self-defense device would allow the users to activate, when in need, in a short time to disable the attacker.

SUMMARY OF THE INVENTION

The invention is directed wearable self-defense apparatus and system that includes a body portion configured to be worn by a person that enables said person to ward off danger and assailants with deterrents including a high voltage transmitter which may be tied to conductors that are electrically charged, a deterrent light emitter that produces a bright and/or strobing light and an audible deterrent that produces an alarm. The body portion may be a wrist band that houses these components. The body portion may also have a wireless signal transceiver or at least a wireless signal transmitter to send an alert notification to an alert contact or two a paired mobile device that then sends an alert notification. The wearable self-defense system may utilize an App on a mobile device, such as a mobile phone to set preferences for alert notifications and preferences for pairing and sensing of gestures to activate the system. One or more of the deterrents may be activated by a specific gesture or sequence of gestures of movements. The body portion may have an accelerometer and a gyroscope to detect motion, orientation of the body portion, orientation or direction of motion and inertial forces. In an exemplary embodiment, the body portion is a wrist band and the activating sequence of motion includes a quick twist of the wrist in a first direction followed quickly by a second twist of the wrist in an opposing direction. The gyroscope may detect this rotational motion and the accelerometer may detect the inertia of this motion to be above a threshold inertia value to activate one or more deterrents and/or alerts. This activation may initiate one or more of the deterrent devices and may send an alert notification to one or more alert contacts. The alert contacts may be required to confirm receipt or the next alert contact on the list is the sent an alert notification. The alert contacts may receive a text or phone call, or an alert screen may pop up when the alert contact also has an associated App running on their mobile device.

Accordingly, the embodiments herein disclose a wearable self-defense apparatus having a body portion configured to be worn on or around a body part of a user. The body portion of the wearable self-defense apparatus houses a high voltage generator configured to generate high voltage electricity for disabling an attacker, a high voltage transmitter electrically coupled to the high voltage generator, a controller configured to control one or more operations of the high voltage generator and a gesture detector operationally coupled to the controller. The gesture detector signals the controller to control the operations of the high voltage generator when the gesture detector detects one or more gestures of the user using the body part attached with the wearable self-defense apparatus. Upon receiving the signal from the gesture detector, the controller triggers the high voltage generator of the wearable self-defense apparatus to generate high voltage electricity. The high voltage electricity thus generated is transmitted to a target using the high voltage transmitter of the wearable self-defense apparatus for temporarily disabling the target. A power source housed within the body portion of the wearable self-defense apparatus powers the above said components to generate non-lethal high voltage electricity to temporarily disable a target.

In an embodiment, the body portion of the wearable self-defense apparatus made from non-conductive materials such as plastic or any other material. In some instances, the body portion of the wearable self-defense apparatus includes an adjustable portion for enabling the user to comfortably attach to the body part such as arm or wrist of the user. In some other instances, the body portions house the high voltage generator, the high voltage transmitter, the controller and the gesture detector. In some embodiment, the wearable self-defense apparatus is in form of a wearable band. In some instance, the wearable self-defense apparatus is operated by detecting a rotation of an arm and wrist of the user in a first direction using the gesture detector to signal the controller to trigger the high voltage generator. In some other instances, the wearable self-defense apparatus is operated by detecting a rotation of the arm and wrist of the user in a second direction using the gesture detector to signal the controller to stop an operation of the high voltage generator. In some embodiment, the electricity transmitted in the wearable self-defense apparatus utilizes one or more electrical conductors to transfer the high voltage generated by the high voltage generator to the designated target. In another embodiment, the wearable self-defense apparatus also includes a fitness tracking module having several sensors to detect one or more physical activities of the user.

Another embodiment discloses a method of utilizing the wearable self-defense apparatus worn on the body part of the user for temporarily disabling an attacker. The method performs by detecting one or more gestures by the user using the body part of the user. The gestures are detected using a gesture detector associated with the wearable self-defense apparatus. In an instant, the step of detecting the gesture using the gesture detector includes detecting a rotation of the body part of the user in a first direction to signal the controller to trigger the high voltage generator and detecting a rotation of the body part of the user in a second direction to signal the controller to stop an operation of the high voltage generator. The gesture detector, upon detecting the gesture, signals a controller to trigger a high voltage generator to generate a high voltage. The wearable self-defense apparatus houses the controller and the high voltage generator. The high voltage generated by the high voltage generator is then transferred to the attacker or the target using a high voltage transmitter associated with the wearable self-defense apparatus. The wearable self-defense apparatus houses the gesture detector, the controller, the high voltage generator and the high voltage transmitter in a body portion configured to be worn on the body part of the user. In some instances, the target is identified by pointing the wearable self-defense apparatus in a particular direction towards the target. The above said method of using the wearable self-defense apparatus enables the users to immediately respond to any aggression or attack from an attacker and disable the attacker using the high voltage generated using the apparatus.

As described herein, the body portion may have a gesture detector that includes one or more sensors, such as an accelerometer and/or a gyroscope to detect motion, orientation of the body portion, orientation or direction of motion and inertial forces. An activation gesture, such as a specific motion or series of motions, such as a twist of the wrist may be required to activate a deterrent device or to initiate an alert notification. The gyroscope may detect this twisting or rotational motion and the accelerometer may detect the inertia of this motion. A threshold value of inertia may be required to activate the wearable self-defense apparatus. The threshold value for inertia may be greater than about 50 N, greater than about 100 N, greater than about 150 N and any value between and including the inertia values provided. The threshold value for inertia may be detected by the gyroscope in degrees per second and a threshold inertia value may be about 40 degrees per second or more, about 80 degrees per second or more, about 150 degrees per second or more, about 200 degrees per second or more, about 240 degrees per second or more and any range between and including the values provided.

The wearable self-defense apparatus may be activated by an activation gesture such as a quick twist of the wrist, including a single twists one direction and then back quickly, or a double twist including a first twist and back and a second twist and back to neutral, or any number of twists such as three, or even four. The fewer the number of twists however, the easier it may be to activate the wearable self-defense apparatus when needed. An exemplary wearable self-defense apparatus may be configured to activate if a flailing motion is detected, such as quick and random motion in various directions with an inertia value greater than a threshold for some threshold period of time such as five seconds or more, or 8 seconds or more, or 10 seconds or more and any range between and including the threshold periods of time provided.

As described herein, the body portion may have a deterrent light emitter that is activated when an activation motion is detected. The deterrent light emitter may emit a deterrent light having an effective lumen such as at least 50 lumens to illuminate the area and draw attention to the attacker. In some cases, the light may be a strobe light that varies in lumen emission or turns on and off rapidly to further draw attention to the situation. The deterrent light emitter may emit a light with enough intensity to temporarily blind or make it difficult for the assailant to see, such as about 100 lumens or more, about 150 lumens or more, about 200 lumens or more, about 300 lumens or more and any range between and including the lumen values provided.

As described herein, the body portion may have an audible deterrent emitter, such as a speaker, that produces an audible deterrent sound that may draw attention to the situation. The audible deterrent emitter may produce a deterrent sound having about 60 dB or more, about 70 dB or more, about 80 dB or more, about 90 dB or more, about 100 dB or more and any range between and including the decibel values provided. The louder the deterrent sound, the more likely it may be that the attacker will quickly leave the scene and that someone may come to the aid of the person wearing the wearable self-defense apparatus. The deterrent sound may be a siren, an alarm sound, a horn, or a verbal sound such as "help" for example. The sound may vary in loudness to further indicate an alarm situation.

An exemplary wearable self-defense apparatus may be activated when the activation motion is detected by the gyroscope and/or accelerometer and one or more of the deterrent devices including the deterrent light emitter, the audible deterrent emitter and the high voltage generator to provide high voltage to the high voltage transmitter. The device may activate all of these deterrent devices or deterrent devices selected for activation by the user through the controller which may be on the body portion or on a remote mobile device, such as a cell phone. The wearable self-defense apparatus may also be configured to contact a call center when activation motion is detected and the call center may call the person wearing the wearable self-defense apparatus to confirm their safety. If no response is provided, the call center may instruct emergency personnel, security and/or law enforcement to the location of the activation, as determined by the global position system of the body portion or mobile device. The wearable self-defense apparatus may also be configured to contact one or more alert contacts with a position of the activation and other pertinent information, such as the name of the person wearing the wearable self-defense apparatus. The user of the wearing the wearable self-defense apparatus may select one or more, two or more, three or more, four or more or even five or more alert contacts to receive a location and their name in the event of activation of the wearing the wearable self-defense apparatus. A larger number of alert contacts may help to ensure someone will to the location for aid and assistance. In an exemplary embodiment, the wearable self-defense apparatus is configured upon activation to activate all three deterrents including the deterrent light emitter, the audible deterrent emitter and the high voltage generator to provide high voltage to the high voltage transmitter, to contact a call center and to contact one or more alert contacts with a location of the activation and the name of the person wearing the wearable self-defense apparatus. These five different actions may help to prevent attack or cause the assailant to leave the area quickly.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments and the embodiments herein include such modifications.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be an included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Figure 1:
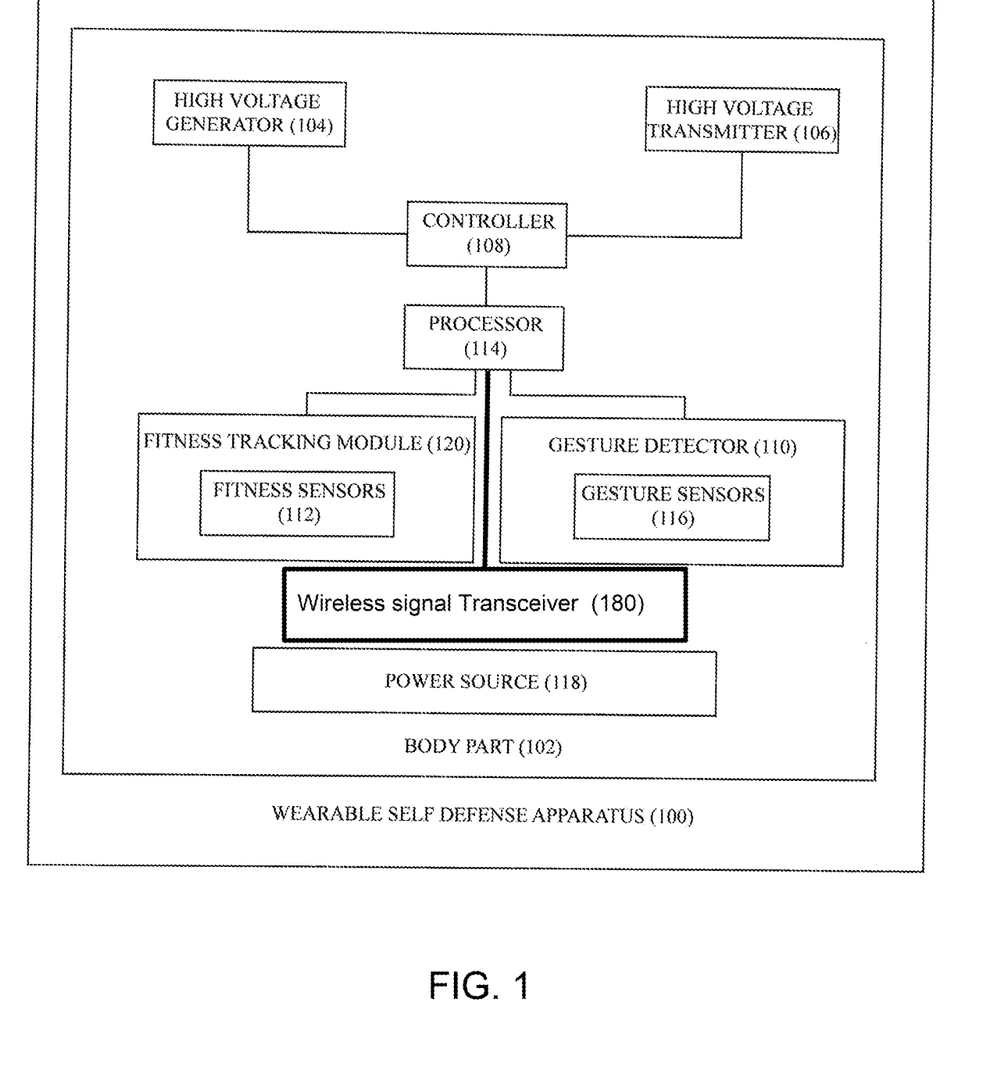
FIG. 1 is an exemplary diagram showing a number of components of a wearable self-defense apparatus.

Accordingly, the embodiments herein provide a wearable self-defense apparatus and a method of using the wearable self-defense apparatus to temporarily disable an attacker. FIG. 1 is an exemplary diagram showing a number of components of a wearable self-defense apparatus 100, according to a preferred embodiment of the present invention. The wearable self-defense apparatus 100 includes a body portion 102 configured to be worn on at least one body part of a user and also configured to house a number of components such as a high voltage generator 104 for generating high voltage electricity, a high voltage transmitter 106 electrically coupled to the high voltage generator for transmitting the high voltage electricity generated by the high voltage generator 104, a controller 108 configured to control one or more operations of the high voltage generator 104 and a gesture detector 110 operationally coupled to the controller 108. The gesture detector 110 signals the controller 108 trigger the high voltage generator 104 upon detecting one or more gestures using the body part of the user. As described herein, the body portion 102 may be a wrist band and the gesture, or specific sequence of motion may be a double twist of the wrist. The body portion 102 further houses a power source 118 connected to one or more components for powering the operations of the components. In an instance, the power source 118 used in the apparatus 100 is a rechargeable battery. The body portion may also have a wireless signal transceiver 180 which may include a wireless signal transmitter and/or wireless signal receiver. In an exemplary embodiment, the wireless signal transceiver is a wireless signal transmitter that transmits signals to a mobile device, such as a mobile phone. Optionally, the wireless signal transceiver may make alert notifications directly by making a phone call directly to an alert contact.

In an embodiment, the body portion 102 housing the high voltage generator 104, the high voltage transmitter 106, the controller 108 and the gesture detector 110 are made from a non-conductive material such as plastic. In some other embodiment, the body portion 102 is made from a combination of non-conductive materials. In a yet another embodiment, the body portion 102 is specially configured to arrange the components such as the high voltage generator 104, the high voltage transmitter 106, the controller 108 and the gesture detector 110 enclosed within the body portion 102. In another instance, the body portion 102 is configured to position some of the components inside and some other components on an exterior of the body portion 102. The body portion 102 can further be made into different shapes for wearing around the body parts of the user. In one instance, the body portion 102 is made into a wearable band that can be worn around the wrist of the user. In some other instance, the body portion 102 is made in form of a wearable ring. In some other instance, the body portion 102 is made in form of a wearable gloves that can be comfortably worn by the user and utilize it when in need.

According to another embodiment, the wearable self-defense apparatus 100 also includes fitness tracking module 120 having one or more sensors 112 to detect a movement and other activities by the user. The data collected using the sensors 112 is sent to a processor 114 within the wearable self-defense apparatus 100 to measure and track the physical activities of the user. In some instances, the data collected using the sensors 112 is utilized for calculating the fitness parameters of the user. In such an instance, the present wearable self-defense apparatus 100 operates as a wearable fitness tracker device capable of tracking the fitness parameters of the user while performing one or more activities by the user. The users can also utilize the wearable self-defense apparatus 100 for self-defense when in need by performing the preset gestures using the body part such as the wrist of arm of the user on which the wearable self-defense apparatus 100 is attached. In some instances, the wearable self-defense apparatus 100 includes a display screen 122 to display a variety of information related to one or more activities of the user while performing fitness exercises.

Figure 2:
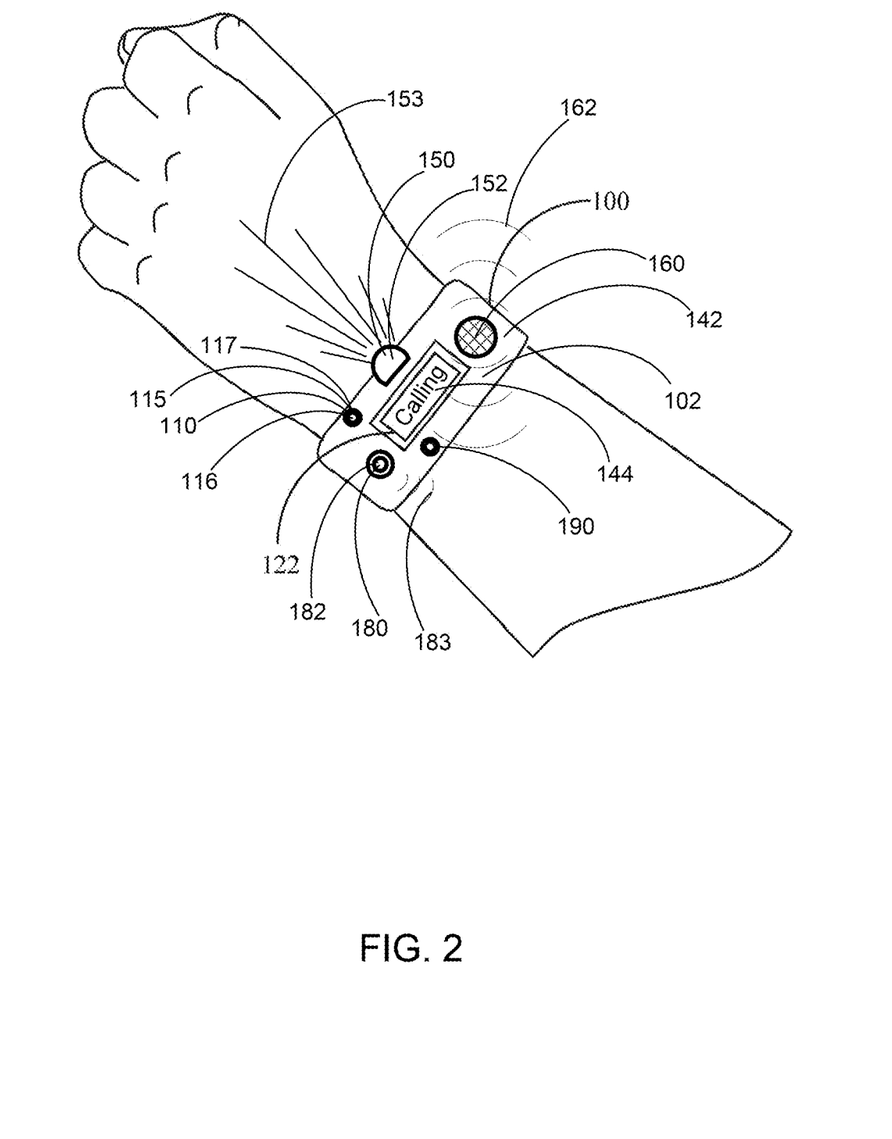
FIG. 2 shows an exemplary body portion, a wrist band, configured around a person's wrist with a plurality of deterrent devices configured thereon.

FIG. 2 is an exemplary diagram showing one or more gestures for operating the wearable self-defense apparatus 100 as a self-defense device, according to an embodiment of the present invention. The wearable self-defense apparatus 100 in form of a wearable band worn on around the wrist or hand of the user includes one or more gesture detecting sensors 116, which forms a part of the gesture detector 110. Once the gesture detecting sensor 116 or sensors detect an action or a gesture using the wrist or arm of the user, it compares the recognized gesture movement with the preset gesture movement for activating or deactivating the high voltage generator or with the gesture for targeting the high voltage to the attacker. As described herein the gesture detecting sensor may be an accelerometer 115 and/or a gyroscope 117.

As shown in FIG. 2, the wearable self-defense apparatus 100 includes a body portion 102 that is a wrist band 142 having a display screen 122 that may display functions of the wearable self-defense apparatus and may also work with a user input 144 for selection of deterrents that will be activated upon detection of an activation gesture and to select alert contacts. The body portion also has a deterrent light emitter 150 that emits a deterrent light 153 which may be a very bright and temporarily blinding light and the light may be a strobe light 152. The body portion 102 further comprises an audible deterrent emitter 160, such as a speaker, that produces an audible deterrent sound 162, such as a very loud noise, alarm or verbal message that is emitted from the speaker. The body portion may also have global positioning system (GPS) 190 that determines the location of the body portion and this location may be provided to alert contacts in the event of activation by an activation motion. The gesture detector 110 may include a gesture detecting sensor 116, such as an accelerometer 115 and/or a gyroscope 117. The body portion may also have a wireless signal transceiver 180 which may include a wireless signal transmitter 182 and/or wireless signal receiver. In an exemplary embodiment, the wireless signal transceiver is a wireless signal transmitter that transmits wireless signals 183 to a mobile device, such as a mobile phone. Optionally, the wireless signal transceiver may make alert notifications directly by contacting directly a call center and/or one or more alert contacts. The wireless signal transceiver may make a phone call or send a text or any other notification to a call center and/or alert contact for effective notification. The wireless signal transceiver may also send a GPS location to one or more of the user's alert contacts.

Figure 3:
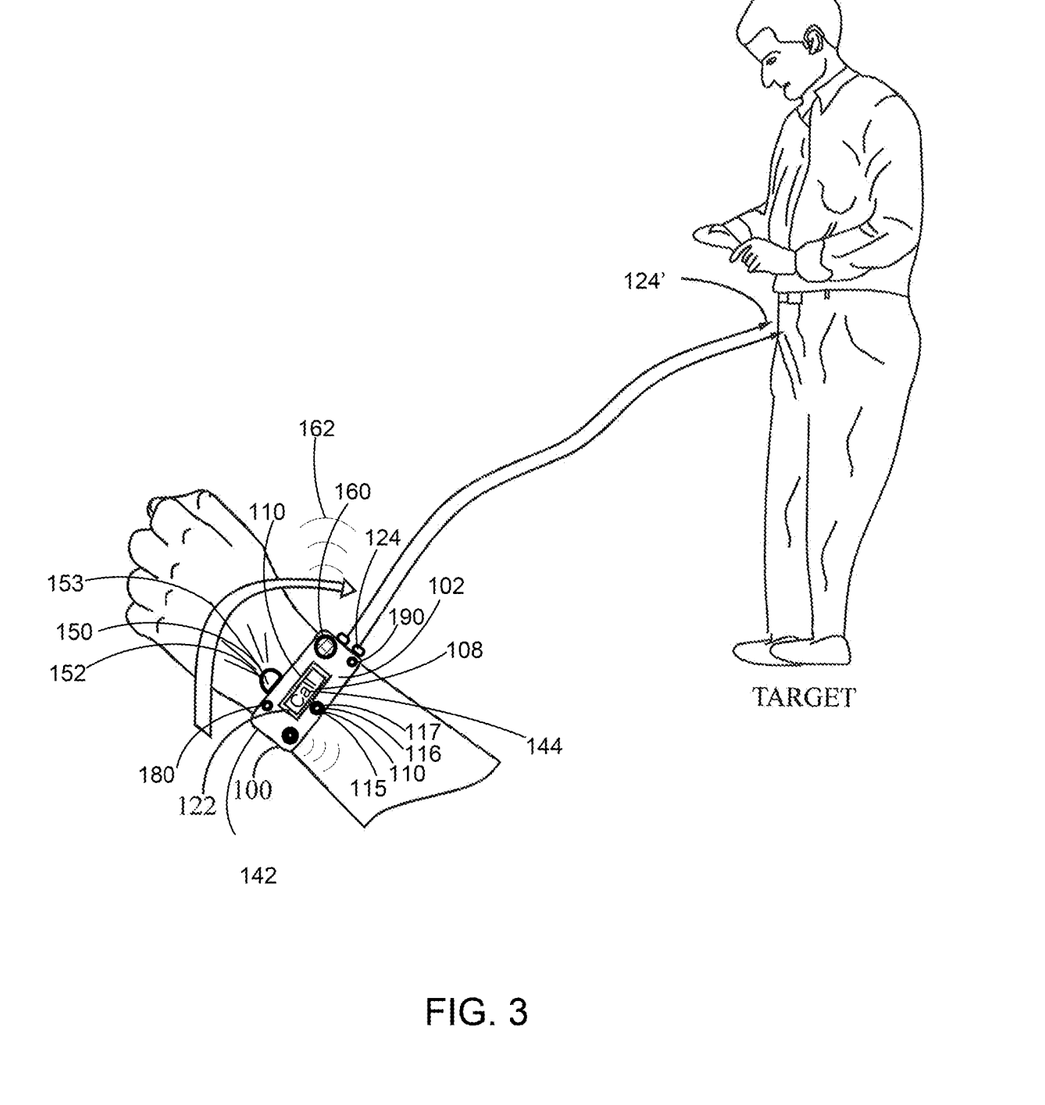
FIG. 3 shows an exemplary body portion, a wrist band, configured around a person's wrist with a plurality of deterrent devices configured thereon including a high voltage transmitter.

FIG. 3 is an exemplary diagram showing a method of using the wearable self-defense apparatus 100 to disable an attacker. In one embodiment, the gesture for activating the high voltage generator 104 is a rotation movement of the arm and wrist of the user. The gesture detecting sensors 116 associated with the gesture detector 110, according to one embodiment, detects a gesture in form of a rotation of the arm and wrist of the user in a first direction to signal the controller 108 to trigger the high voltage generator 104. A specific sequence of motion may be required to activate the wearable self-defense apparatus to initiate one or more features including the high voltage generator, deterrent light emitter and/or audible deterrent. The specific motion or gesture, such as at least one twist of the wrists in a first direction followed by a second twist of the wrist in a second and opposite direction, is performed within a threshold time of less than 1 second, or less than about 0.7 seconds or even less than about 0.5 seconds. The twist of the wrists may also have to have some inertial component, requiring a quick twist of the wrists in the first and then quickly twisting back in the second and opposite direction. The gesture detecting sensors 116 associated with the gesture detector 110, according to one embodiment, detects another gesture in form of a rotation of the arm and wrist of the user in a second direction to signal the controller 108 to stop an operation of the high voltage generator 104. The rotational movement of the arm and wrist of the user wearing the apparatus 100 can be in opposite directions to activate and deactivate the high voltage generator 104 using the controller 108. Once the high voltage generator 104 generates the high voltage electricity, the user can direct the apparatus 100 to the attacker and the high voltage transmitter 106 transmits the generated high voltage to the attacker or the target for temporarily disable the target. In certain embodiment, the high voltage transmitter 106 includes one or more electrical conductors 124 to transfer the high voltage generated by the high voltage generator 104 to the target. The conductors 124' may be contacted to any portion of a target, such as the chest, neck or groin as shown.

Figure 4:
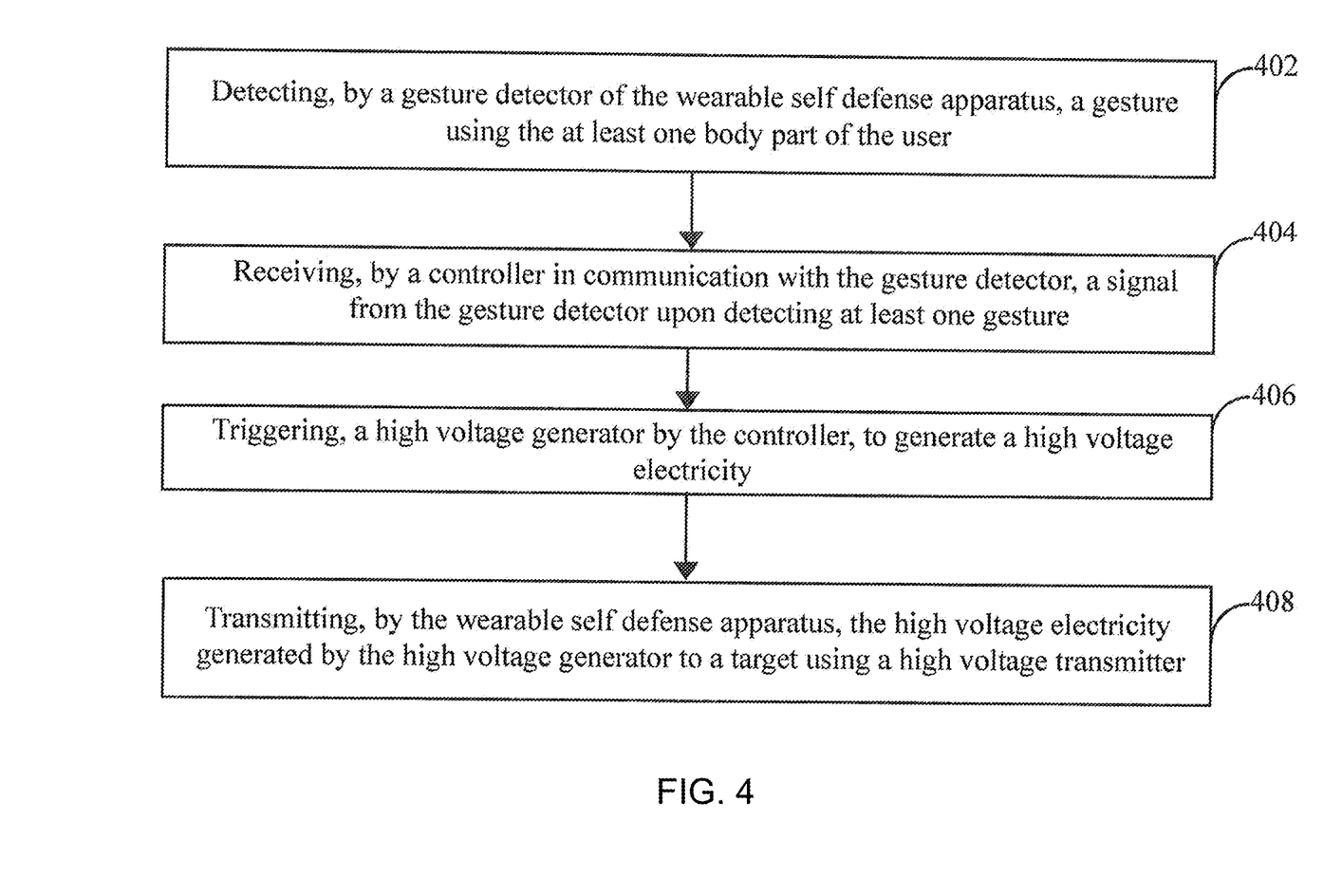
FIG. 4 is a flowchart of an exemplary method of utilizing the wearable self-defense apparatus worn on the body part of a user.

FIG. 4 is a flowchart of an exemplary method of utilizing the wearable self-defense apparatus 100 worn on the body part of a user to temporarily disable an attacker or a target. When the user encounters an attacker, the user can perform one or more of the following actions to temporarily disable an attacker. The method includes the steps of detecting, by the gesture detector 110, one or more gestures made using the body part of the user where the wearable self-defense apparatus 100 is attached, as in block 402. In one embodiment, the gesture for activating the high voltage generator 104 is a rotation movement of the arm and wrist of the user. The gesture detecting sensors 116 associated with the gesture detector 110, according to one embodiment, detects the gesture in form of a rotation of the arm and wrist of the user in a first direction to signal the controller 108 to trigger the high voltage generator 104. In some instance, the gesture detector 110 detects another gesture in form of a rotation of the arm and wrist of the user in a second direction to signal the controller 108 to stop an operation of the high voltage generator 104. In some other instances, only one gesture is used for operating the wearable self-defense apparatus 100. Once the gesture detector 110 identifies the gesture for activating the self-defense operation or mode of the wearable self-defense apparatus 100, a signal is automatically sent to the controller 108 for triggering the high voltage electricity using the high voltage generator 104, as in block 404. Upon receiving the trigger signal from the controller 108, the high voltage generator 104 generates the high voltage electricity as in block 406. Once the high voltage electricity is generated, the user can perform another gesture action to transmit the high voltage generated by the high voltage generator 104 to the target using the high voltage transmitter 106, as in block 408. In certain instances, the high voltage to the target is transmitted using one or more electrical conductors 124 electrically coupled to the high voltage transmitter 106. In some instance, the electrical conductors 124 are wired to the high voltage transmitter 106 or to an output of the high voltage generator 104. In some other instances, the high voltage transmitter 106 transmits the high voltage using conductors, such as electrodes, that can be contacted to the body of the target to transfer the high voltage to the target. In some instances, the target is identified by the electrical conductor 124 based on a direction of pointing of the wearable self-defense apparatus 100 by the user.

Figure 5:
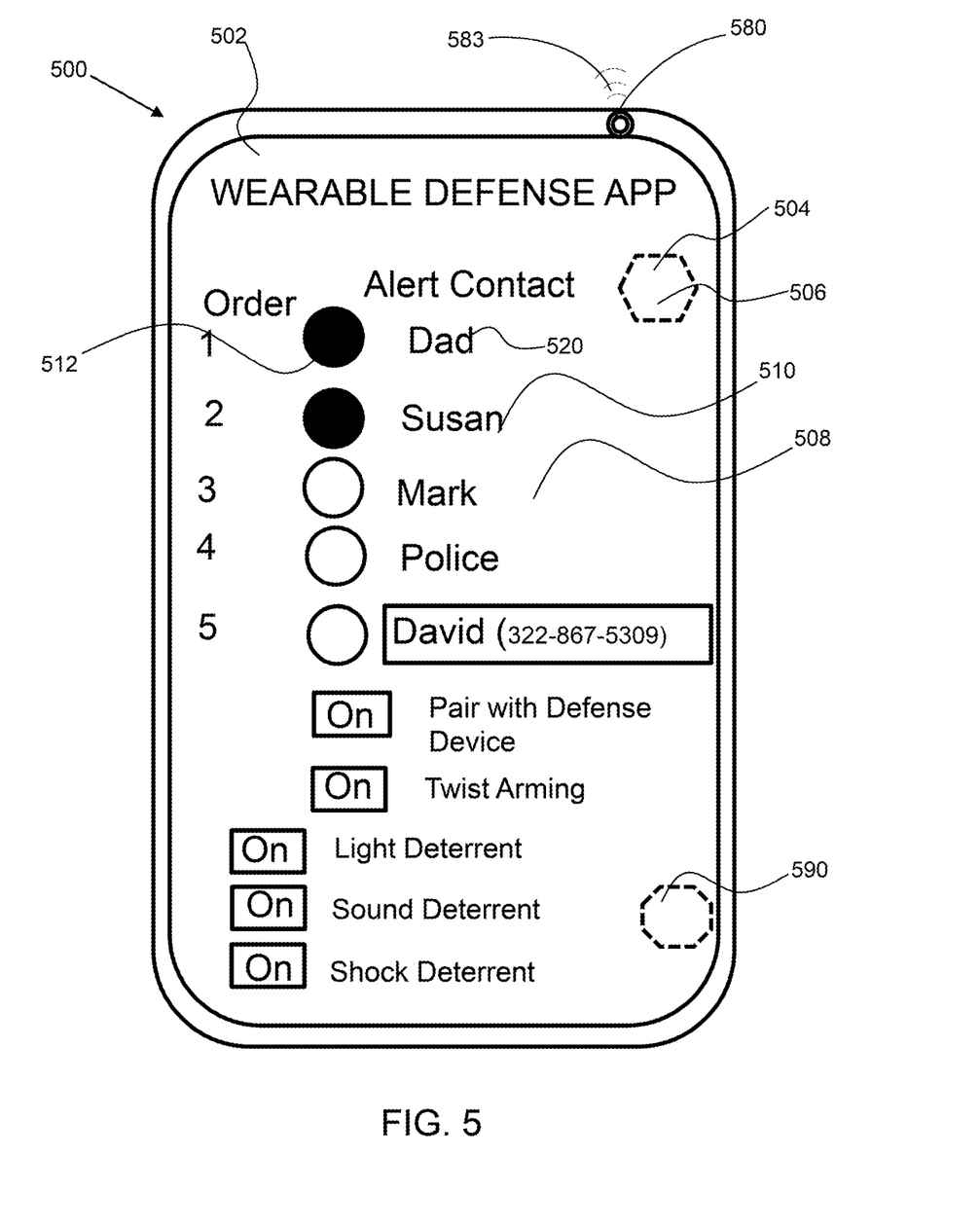
FIG. 5 shows an exemplary mobile device that is paired with the wearable self-defense apparatus and configured send an alert notice to one or more selected alert contacts when the wearable self-defense apparatus is activated.

As shown in FIG. 5, an exemplary mobile device 500 is paired with the wearable self-defense apparatus and is configured send an alert notification to one or more selected alert contacts 520 when the wearable self-defense apparatus is activated. The mobile device may be a mobile phone 502 that has a computing device 504, such as a microprocessor, configured to run application software (App), 506 that interfaces with the wearable self-defense apparatus. The App provides a user input 510, which may act as a controller 508 wearable self-defense apparatus. The App may enable an alert contact input 512 or selection of one or more alert contacts 520 from their list of contacts in their mobile device and also alert other contacts, such as the police or other security agency, such as campus security. A user may change the order of the contacts and select which alert contact to be notified upon activation of the wearable self-defense apparatus. As shown, Dad and Susan are selected, as indicated by the black circle, to receive an alert notification when the wearable self-defense apparatus is activated. If Dad and Susan do not confirm the alert notification within a threshold period of time, then the next alert contact, Mark, would receive an alert notification and so on.

As shown in FIG. 5, the App may provide a user input to pair with the mobile device and to automatically make the alert notifications from a body movement arming, such as a specific sequence of twisting of the wrists, a double twist, as detailed herein. The App may also provide user selections for the type of deterrents they want activated including the light deterrent, the sound deterrent and the shock deterrent, which activates the high voltage conductors. A user may only want to have the light and sound deterrent on in some situations and then the shock deterrent on when in more dangerous situations. All of these user inputs and features may also be selected through the display screen and user input on the body portion.

The mobile device 500, such as a mobile phone 502 may have a wireless signal transceiver 580 that transmits and/or receives wireless signals 583 for communication with the body portion and/or with an alert contact or call center. The mobile device may also have a global positioning system 590 that is used to provide a location to an alert contact or call center in the event of activation by an activation motion.

Figure 6:
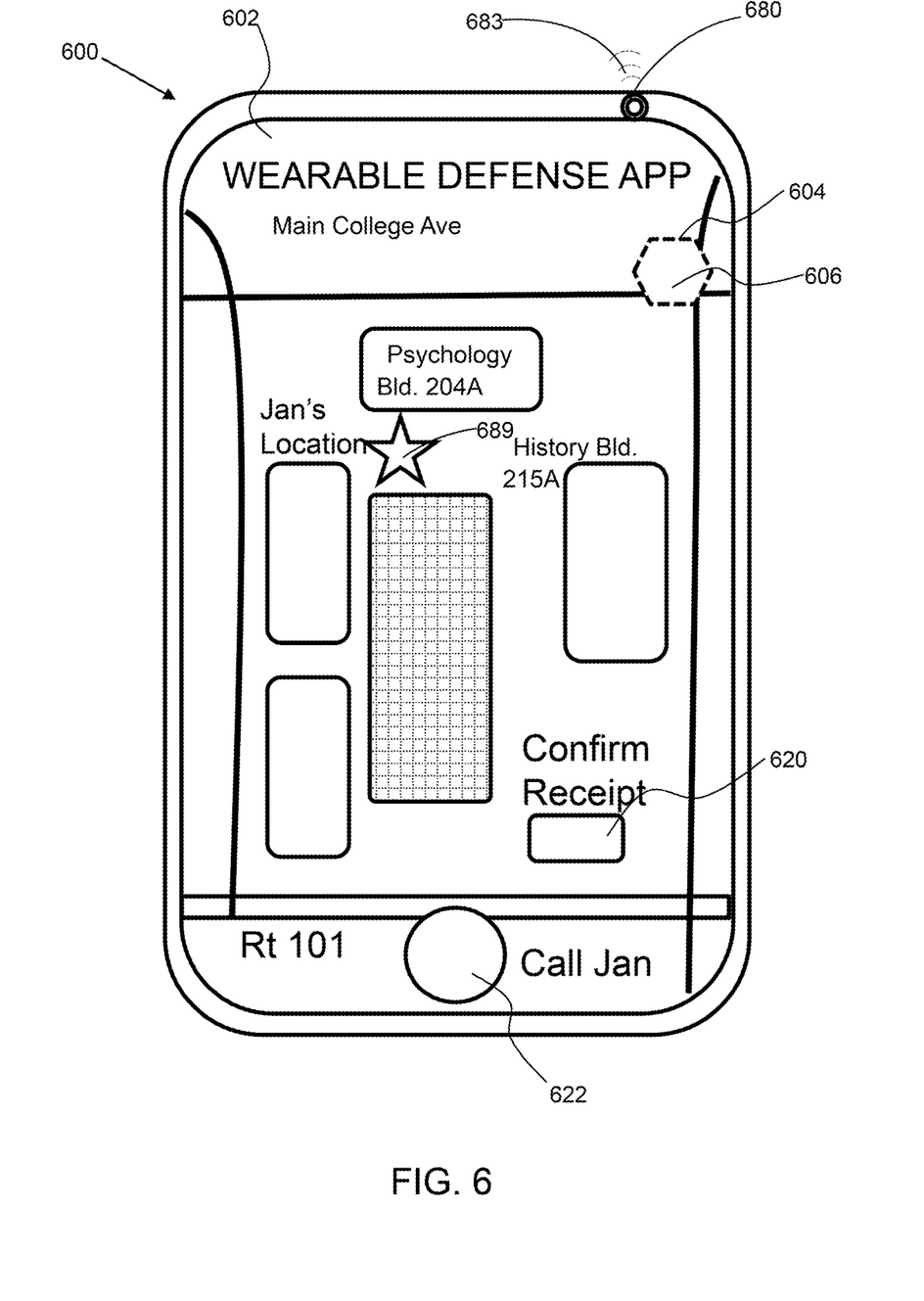
FIG. 6 shows an exemplary mobile device of an alert contact after an alert has been sent via the wearable self-defense apparatus to said alert contact and wherein the alert includes a map showing the location of Jan's location.

As shown in FIG. 6, an exemplary mobile device 600, such as a mobile phone 602, of an alert contact has received an alert notification from Jan. The mobile phone has wireless signal transceiver 680 that receives a wireless signal 683. The alert notification may be a call or text, or an APP may open an alert screen, as shown, that details the location 689 of the sender, Jan. The alert contact may download an APP that interfaces with the App on the sender's mobile device. The alert contact's mobile phone has a computing device 604, such as a microprocessor, configured to run application software (App), 606. An alert notification may have a confirm receipt input 620 and may have a call sender feature 622 that enables one touch calling of the sender of the alert notification.

Further, it should be noted that the steps described in the method of use can be carried out in many different orders according to user preference. The use of "step of" should not be interpreted as "step for", in the claims herein and is not intended to invoke the provisions of 35 U.S.C. 112. Upon reading this specification, it should be appreciated that, under appropriate circumstances, considering such issues as design preference, user preferences, marketing preferences, cost, devices requirements, available services, technological advances, etc., other methods of use arrangements such as, for example, use of any other targeting method for delivering the high voltage electricity, elimination or addition of certain steps, including or excluding certain maintenance steps, etc., may be sufficient.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A wearable self-defense system comprising a wearable self-defense apparatus comprising:
   a body portion configured to be worn on at least one body part of a user;
   a high voltage generator configured to be secured to the body portion;
   a high voltage transmitter electrically coupled to the high voltage generator and comprising at least one electrical conductor to transfer high voltage electricity generated by the high voltage generator;
   a controller configured to control at least one operation of the high voltage generator; and
   a gesture detector operationally coupled to the controller, wherein the gesture detector, is configured to detect a plurality of gestures, and upon detecting an activation gesture using the at least one body part of the user, signaling the controller to control the at least one operation of the high voltage generator;
   wherein the body portion is configured to be worn around a wrist of the user, and wherein the gesture detector is configured to detect the activation gesture comprising:
   a rotation of the wrist of the user in a first direction that signals the controller
   to trigger the high voltage generator,
   wherein the high voltage transmitter is configured to direct said high voltage electricity to the conductors; and
   wherein said activation gesture includes a double rotation including said rotation of the wrist of the user in said first direction and a rotation of the wrist in a second and opposing direction from said first direction and then a repeat of said rotation of the wrist of the user in said first direction and said rotation of the wrist in said second and opposing direction from said first direction.

2. The wearable self-defense system of claim 1, wherein the body portion houses the high voltage generator, the high voltage transmitter, the controller and the gesture detector.

3. The wearable self-defense system of claim 1, wherein the body portion includes at least one adjustable portion to fit to the at least one body part of the user.

4. The wearable self-defense system of claim 1, wherein the body portion is made from at least one nonconductive material.

5. The wearable self-defense system of claim 1, wherein the body portion comprises a wearable band.

6. The wearable self-defense system of claim 1, wherein the body portion further houses a fitness tracking module having a plurality of sensors to detect at least one physical activity of the user.

7. The wearable self-defense system of claim 1, wherein the body portion further houses at least one power source coupled to the high voltage generator, the high voltage transmitter, the controller and the gesture detector.

8. The wearable self-defense system of claim 1, wherein the body portion further houses a deterrent light emitter.

9. The wearable self-defense system of claim 8, wherein the deterrent light emitter is configured to emit a deterrent light when the activation gesture is detected.

10. The wearable self-defense system of claim 9, wherein the deterrent light is a strobe light.

11. The wearable self-defense system of claim 1, wherein the body portion further houses an audible deterrent emitter.

12. The wearable self-defense system of claim 11, wherein the audible deterrent emitter is configured to produce an audible deterrent when the activation gesture is detected.

13. The wearable self-defense system of claim 1, wherein the body portion further houses a wireless signal transmitter coupled with the gesture detector and configured to send an alert notification to an alert contact when the activation gesture is detected by said gesture detector.

14. The wearable self-defense system of claim 13, wherein the alert notification is a phone call to the alert contact's mobile phone.

15. The wearable self-defense system of claim 1, wherein the body portion further houses a wireless signal transmitter, and wherein the wearable self-defense system further comprising a mobile phone having a computing device configured to operate an application software that interfaces wirelessly with the wireless signal transmitter housed on the body portion, and wherein the mobile phone is configured to send an alert notification to an alert contact when the activation gesture is detected by said gesture detector.

16. The wearable self-defense system of claim 15, wherein the application software has a user input to select one or more alert contacts to receive an alert notification when the when the activation gesture is detected by said gesture detector.

17. The wearable self-defense system of claim 15, wherein the application software has a user input to turn on and off gesture detection.

18. The wearable self-defense system of claim 15, wherein the application software has a user input to turn on and off the high voltage generator.

19. The wearable self-defense system of claim 1, wherein the activation gesture includes said rotation of the wrist of the user in said first direction and a rotation of the wrist in a second and opposing direction from said first direction.

* * * * *